Figure 1:
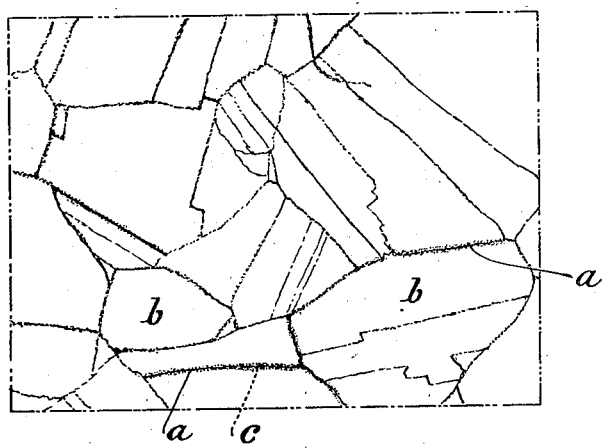

Jan. 14, 1936.  P. SCHAFMEISTER ET AL  2,027,554

CHROME NICKEL STEEL ALLOY PRODUCT AND METHOD OF MAKING THE SAME

Filed May 28, 1931

WITNESS

G. V. Rasmussen

INVENTORS
PAUL SCHAFMEISTER
ERWIN ALFRED SPENLÉ

BY

ATTORNEYS

Patented Jan. 14, 1936

2,027,554

UNITED STATES PATENT OFFICE 2,027,554

CHROME NICKEL STEEL ALLOY PRODUCT AND METHOD OF MAKING THE SAME

Paul Schafmeister and Erwin Alfred Spenlé, Essen, Germany, assignors to Fried. Krupp A. G., Essen, Germany, a corporation of Germany Application May 28, 1931, Serial No. 540,634
In Germany June 2, 1930

7 Claims. (Cl. 148—12)

This invention relates to the manufacture of chrome nickel steel articles which in their manufacture or use involve exposure to temperatures equivalent to drawing temperatures within the general range of 500° to 900° C. The object of the invention is to provide a method of treatment and to produce a product which will remain adequately resistant against corrosive agents notwithstanding exposure to temperatures of the stated range during manufacture or use. Corrosion-resisting austenitic chrome nickel steel alloys of the general composition of 6% to 40% chrome, 40% to 4% nickel, and carbon up to say 0.5%, as well as articles made from such alloys, as sheets, strips, or wires, have a stable surface, or, as it sometimes is termed, are chemically neutral, but lose this quality, lose ductility, and become brittle when they are exposed in the course of their manufacture or use to temperatures comparable to a drawing treatment of 500° to 900° C. accompanied or followed by exposure to corrosive influences.

The cause of this phenomenon is generally recognized as due to the following circumstances: the austenitic chrome nickel steel alloys and articles made therefrom, when they are in their manufacture treated at temperatures of about 1050°–1150° C. or higher, hold the contained carbon or carbides in solution and, being quickly cooled, afford no opportunity for the carbon to go out of solution, so that in the cooled product the carbon still remains in solution. When, however, the products are subjected to prolonged exposure at temperatures of 500° to 900° C., the carbon goes out of solution and appears as carbide at the grain boundaries of the intercrystalline structure. The ensuing lack of resistance of subsequently applied corrosive agents is generally ascribed to these carbides as well as to the resulting local reduction of chrome content at the grain boundaries of the austenitic material. If after the intercrystalline formation of the carbides as the result of exposure to temperatures of 500° to 900° C. comparable to drawing, the articles are again exposed to the higher temperatures of upwards of 1020° C., the carbides again begin to go into solution and the product can thereby be brought to a condition where it is as corrosion-resistant as it was initially, but in many cases such subsequent high heat treatments are impractical, if not impossible. One of the common instances of such conditions will be found in the construction of vessels or containers of larger dimensions which in their use are exposed to corrosive influences but not high temperatures, i. e. to temperatures very materially below 500° C., but where in the construction of the containers it is necessary to weld together plates or parts which enter into the structure. The welding treatment carries with it, at areas closely adjacent to the weld seam itself, temperature conditions which fall within the carbide precipitation range at and where the welding heat is dissipated laterally of the seam. These areas, when subsequently exposed to corrosive attack, are incapable of resisting such attack and the utility of the welded article as a corrosion-resistant utensil is accordingly destroyed. It is one of the important objects of the present invention to provide a preventative for such conditions, i. e., where the use of the utensil is one which in itself does not involve exposure to temperatures within the carbide precipitation range, although such use does require that all sections of the utensil shall be resistant to corrosive attack.

Several remedies to counteract the undesirable condition have been proposed. Some have involved modifications of the percentage of certain of the components of the alloy, especially the restriction of carbon to less than .07%, while others have proposed the addition to the alloy of agents such as titanium and vanadium in sufficient amounts to combine in stable composition with practically all of the carbon in the alloy. In all these cases, however, the effort has been, by varying the carbon component or by adding an agent for coaction with the carbon, to eliminate as far as possible, if not to prevent altogether, the creation of such carbides or carbon combinations as lack the property of resisting corrosive influences.

In contrast with such prior proposals, the present invention attacks the problem in an entirely different manner. Instead of attempting to modify the chemical composition of the alloy, especially with respect to carbon and carbide-forming substances, the present invention contemplates taking the alloy just as it is and then deliberately and purposely subjecting it to treatments which will compel all of the carbon that would ever come out of solution under any circumstances to come out of solution then and there. The result will, of course, be an alloy or an article containing, purposely produced, the objectionable intercrystalline carbides. Thereupon, by physical deformation sufficient to destroy the then existing crystalline structure, at temperatures below those at which recrystallization can take place during the deformation period, the grains or crystals of alloy material are elongated, their borders ruptured, and the carbides positioned in the mass indiscriminately, without regard to their previous position as intercrystallinely located carbides. When this condition has been arrived at, the article is subjected to a recrystallizing treatment at elevated temperatures below those where the carbides again go in solution. Such recrystallizing temperatures are for practical purposes in the neighborhood of 950° to 980° C., but should not exceed 1020° C. This recrystallization treatment, applied at a time when all the carbides that would ever come out of solution have come out of the solution and were repositioned throughout the mass of alloy, causes the formation of a new intercrystalline structure, but the carbides will not be located in intercrystalline position with respect thereto but will be distributed throughout the bodies of these crystals as inert material included within and surrounded by alloy material. If thereupon the article is exposed to temperatures between 500° and 900° C., there is no occasion for the carbides to come out of solution at the grain borders, since all the carbides that would have come out of solution are still out of solution and stay where they are, encased within alloy material under no urge to form or to deposit themselves anew at the grain boundaries of the newly found grains or crystals.

Figure 2:
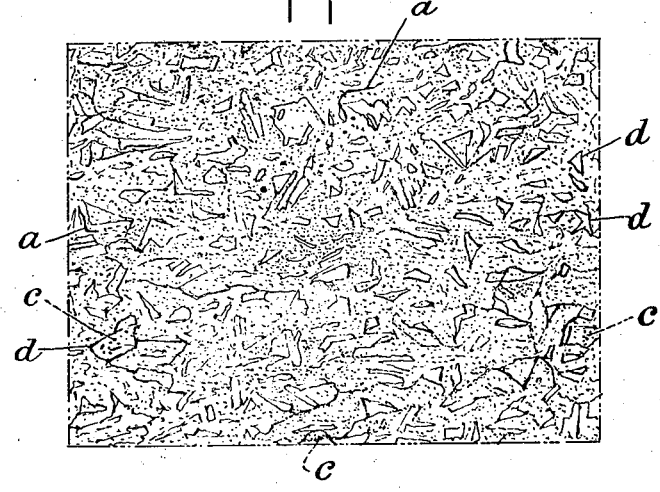

The invention is illustrated in the drawings in which Fig. 1 represents diagrammatically and illustratively the intercrystalline structure magnified 500 times of a section of austenitic chrome nickel steel alloy after exposure to a temperature of say 700° C. under conditions comparable to a drawing treatment. Fig. 2 is a similar view of the same section after recrystallization at a temperature of 950° C. representative of the finished product.

In Fig. 1 $a$ represents the edges or borders of the grains or crystals $b$, while $c$ represents the intercrystallizing carbide particles. It will be observed that the carbide particles $c$ in Fig. 1 are situated in the intercrystalline portion of the structure, while in Fig. 2 the carbide particles $c$ are indiscriminately redistributed throughout the mass with the lines $a$ torn and broken. In Fig. 2 the carbide particles $c$ still appear as indiscriminately distributed particles, while new crystals having borders $d$ have formed in such a way that only a relatively insignificant number of carbide particles are to be found in any part of the intercrystalline structure.

The initial intercrystalline carbide formation which occurs when temperatures similar to drawing treatments are applied, depends somewhat on the temperature. Between 600° and 700° C. the carbides occur as intercrystalline carbides in the form of fine distribution which might be described as a carbide film. At temperatures of 800° to 900° C., the carbides form larger aggregates and in that form are less responsive to intercrystallinely effective corrosive influences than in the film form. Accordingly, according to the present invention it is preferred in the conduct of the cold deformation treatment or in an antecedent heating of the alloy to go to temperatures of the higher range. In order to carry out the present invention, articles such as sheets, strips, or wires of corrosion-resisting austenitic chrome nickel steel alloys may be exposed for a sufficiently extended period of time to achieve the desired result, to temperatures of 500° to 900° C., preferably inclusive of the higher temperatures of said range until practically the entire carbon and/or carbide comes out of solution, whereby all danger that carbon still in solution might later appear as intercrystalline carbide substances is avoided. This extrusion, so to speak, of the carbon content, while it may be effected by a separate pretreatment, can also be effected or supplemented in part by the cold deformation treatment. The rate at which the carbides come out of solution and appear in the intercrystalline structure is greatest at temperatures of about 600° to 900° C., but can be further increased by means of rolling or the like.

The cold deformation treatment is effected by such means as rolling, forging, pressing, drawing, and while these operations heat the articles which are subjected to the treatment, that is the sheets, strips, wires, etc., the heat is below that where recrystallization can take place, i. e., speaking generally, below 950° C. This so-called cold deformation treatment should be conducted to such an extent that a deformation of at least 15% is effected, in order to assure the repositioning of the carbides from the intercrystalline location into the intracrystalline location. A deformation of somewhat above 50% has proved itself especially advantageous. In any event the character of the deformation which is to be effected must be one which is destructive of the initial crystalline structure, i. e. must be at least 15% and preferably very much greater. The temperature to be used and attained during the deformation treatment is somewhat dependent upon the constitution of the austenitic chrome nickel steel alloy material, but the best temperatures can be readily determined for every particular alloy by means of a test run.

After the effect of the cold deformation treatment has been achieved, the temperature is preferably raised to the recrystallization degree. This temperature with respect to austenitic chrome nickel steel alloys lies above approximately 850° C., but must not exceed 1020° C. or that temperature at which the separated carbides develop an active tendency to go back into solution. The phenomenon of recrystallization is one where an entirely new grain structure develops from the strain-hardened metal. The old grains entirely disappear and the indications of cold working disappear. The accepted explanation of these phenomena is that recrystallization is a reaction involving both time and temperature, and, accordingly, after the temperature has been raised to the recrystallization degree within the temperature limits above indicated, the recrystallization levels of temperatures between the stated limits must be maintained for a time or period sufficient to effect the desired recrystallization at the particular temperature or temperatures within the stated limits at which the recrystallization treatment is carried out. Effecting such recrystallization, following the introductory steps of compelling the segregation of carbides by subjecting the alloys to temperatures within the carbide precipitation range and very substantially rupturing and deforming the original crystalline structure of the alloy, is an essential feature of the present invention. Merely carrying the material as affected by the introductory steps to the state of incipient recrystallization is not sufficient because until actual recrystallization is effected at the appropriate temperatures, maintained for the appropriate period of time, the intergranular fields of local depletion of chromium and the deposition of carbides along the original grain boundaries will remain open to attack by corrosives and it is only when recrystallization has taken place and the originally corrosively attackable areas have been positioned mainly as intracrystalline material, that the results of the present invention are obtained. The final recrystallization treatment may be applied as a direct continuation of the cold deformation treatment, so that the two treatments, while apparently a single continuous procedure, are nevertheless distinct and separate in their respective effects.

The precise temperatures involved in each stage of the forming process have considerable latitude, but will in every instance be a sequence of temperatures falling within the following three classes:

1. Temperatures at which carbon comes out of solution and appears as intercrystalline carbide; preferably temperatures at which all carbon that can ever come out of solution will come out of solution at the outset.

2. Temperatures below recrystallization temperatures but at which the original intercrystalline structure is broken down and the intercrystalline carbides are indiscriminately positioned throughout the mass of alloy material without regard to intercrystalline position, and 3. Temperatures below those at which the carbides again go in solution but sufficiently high to cause recrystallization.

The three temperature stages may overlap. Thus the whole or a part of the effect of the first temperature stage may be performed by the second, while the second and the third can be run together, so as not to be apparently separate except so far as concerns the separate results accomplished by an apparently continuous deformation and crystallizing treatment.

It will be noted that articles such as sheets, strips, or wires which have been subjected to the described treatments are composed of crystalline austenitic chrome nickel steel alloy containing as intracrystalline particles, carbides which originated within the structure as intercrystalline carbides, and, in the preferred embodiment of the invention, practically the whole of the separable carbides capable of coming out of solution at temperatures within the range of 500° to 900° C. Accordingly, when such articles, so treated, are exposed in use to temperatures of 500° to 900° C., the corrosive agents will not have access to intercrystalline carbides or to the carbides which are encased within the grains or crystals of alloy material and the product will be corrosion-resistant to a corresponding degree. In other words, such articles so treated can be used in the presence of corrosive agents notwithstanding the fact that the use involves temperatures of the troublesome range. On the other hand, articles which are made of alloy treated as described, notwithstanding welding operations used in connection with their fabrication, remain relatively proof against corrosive influences and resistant against the tendency of becoming brittle at the zones where, as the result of the welding treatment they were exposed to 500° to 900° C. and such fabricated articles therefore excellently serve the purpose of containers, vessels, made of sheet material for use in the milk industry, beverages, storage vats for fluids of various characters, and similar articles of manufacture, i. e. where the articles, once fabricated, are thereafter in their use required to resist at normal temperatures, very materially below 500° C., corrosive attack of such corrosive force as the attacking agents possess at such temperature.

When it is stated that the products of the described process are corrosion-resistant, this expression is not used in its absolute sense. In other words, the product, while not as perfectly corrosion-resistant as chrome nickel steels in the form of homogeneous austenite, is nevertheless sufficiently corrosion-resistant for the purposes of many uses and applications for some of which, indeed, the product of the present application represents a preferred structure. In that connection attention is called to the fact that steel manufactured in accordance with the present invention, sheets, for example, possess higher tensile properties than material of the same analysis in the pure austenitic state. For example, the yield point expressed in kilograms per square millimeter, is but twenty-two for the latter and thirty-five for the former, while the ultimate strength, also expressed in kilograms per square millimeter, is sixty for the latter and seventy for the former.

During the cold deformation treatment referred to in this application, it is apparent that the crystalline structure tends to become more and more laminated, the borders being finally ruptured to a greater or lesser extent according to the intensity of the deformation treatment. In any event, the deformation treatment should be carried at least to the point where the relation between the carbide particles and the original grain borders is such that, on the recrystallization treatment at the temperatures set forth in this specification the carbides will not to any substantial extent again appear on the grain borders of the crystalline structure which results from such recrystallization treatment.

After the recrystallization treatment the products are cooled either quickly by exposure to a cooling medium or slowly, as the result of withdrawal from the temperature zone of the recrystallization treatment or in any other suitable way.

We claim:

1. The method of treating austenitic chrome nickel steel alloy products having a stable surface in order to render them resistant against becoming brittle when exposed to temperatures of the order of 500° to 900° C., and simultaneous or subsequent exposure to corrosive agents which comprises exposing said products to temperatures within the said range and thereby rendering them susceptible throughout to intercrystalline attack by corrosive agents as the result of carbon appearing as carbide on the grain borders of the crystalline structure of the alloy, subjecting the susceptible products to a cold deformation treatment such as rolling, forging, pressing, drawing, or the like until said products have been thoroughly laminated and deformed to an extent of at least 15% and thereupon recrystallizing the deformed product by treatment at temperatures below that temperature within the general range of 900° to 1100° C. at which the carbides contained in the alloy as separated carbides or the constituents of such carbides again go into solution in the alloy and continuing said heat treatment for a period of time sufficient to effect such recrystallization at such temperatures.

2. The method as set forth in claim 1 in which the deformation is carried to a point upwards of 50%.

3. The method of treating austenitic chrome nickel steel alloy products having a stable surface which comprises first heating within the carbide precipitation range, second, cold working, and third, reheating above the recrystallization temperature but below the temperature at which the carbides redissolve, to effect recrystallization of the cold-worked metal.

4. The method of treating austenitic chrome nickel steel alloy products having a stable surface which comprises the three steps, viz, 1, heating within the carbide precipitation range to effect precipitation of carbides at the grain boundaries, 2, cold working of the material while in the condition where carbides have been precipitated by the first step to effect deformation of the mass to an extent of at least 15%, and 3, after said cold-working step, reheating above the recrystallization temperature but below the temperature at which the carbides redissolve, to effect recrystallization of the cold-worked metal and an indiscriminate distribution of carbide particles with reference to the recrystallized structure.

5. A product such as is obtainable by subjecting austenitic chrome nickel steel alloy material having a stable surface to treatment involving the following steps, first heating within the carbide precipitation range, second, cold working, and third, reheating above the recrystallization temperature but below the temperature at which the carbides redissolve, to effect recrystallization of the cold-worked metal.

6. A product such as is obtainable by subjecting austenitic chrome nickel steel alloy material having a stable surface to treatment involving the following steps, viz, 1, heating within the carbide precipitation range to effect precipitation of carbides at the grain boundaries, 2, cold working of the material while in the condition where carbides have been precipitated by the first step to effect deformation of the mass to an extent of at least 15%, and 3, after said cold-working step, reheating above the recrystallization temperature but below the temperature at which the carbides redissolve, to effect recrystallization of the cold-worked metal and an indiscriminate distribution of carbide particles with reference to the recrystallized structure.

7. A welded product suitable for uses involving exposure to corrosive influences at temperatures including atmospheric temperatures and below 450° C. such as is obtainable by welding austenitic chromium nickel steel alloy material which has been subjected to the following steps, first, heating within the carbide precipitation range, second, cold working until the material has been deformed to an extent of at least 15%, and third, heating above the temperature of the carbide precipitation range but below the temperature at which the carbides redissolve, to effect recrystallization of the cold-worked metal.

PAUL SCHAFMEISTER.
ERWIN ALFRED SPENLÉ.